US012809388B2

(12) United States Patent
Lindquist et al.

(10) Patent No.: US 12,809,388 B2
(45) Date of Patent: Nov. 24, 2026

(54) SYSTEM AND METHOD FOR CONTROLLING AN AUTONOMOUS VEHICLE USING A PROBABILISTIC OCCUPANCY GRID

(71) Applicant: Volvo Autonomous Solutions AB, Gothenburg (SE)

(72) Inventors: Per Lindquist, Gothenburg (SE); Petter Wirfält, Hindås (SE); Magnus Rindeberg, Billdal (SE); Chao Li, Torslanda (SE); Henrik Kaijser, Billdal (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 87 days.

(21) Appl. No.: 18/855,216

(22) PCT Filed: Apr. 13, 2022

(86) PCT No.: PCT/EP2022/059927
§ 371 (c)(1),
(2) Date: Oct. 8, 2024

(87) PCT Pub. No.: WO2023/198286
PCT Pub. Date: Oct. 19, 2023

(65) Prior Publication Data
US 2026/0093257 A1 Apr. 2, 2026

(51) Int. Cl.
*G05D 1/246* (2024.01)
*G05D 1/622* (2024.01)

(52) U.S. Cl.
CPC .......... *G05D 1/2464* (2024.01); *G05D 1/622* (2024.01)

(58) Field of Classification Search
CPC ............................ G05D 1/2464; G05D 1/622
See application file for complete search history.

(56) References Cited

U.S. PATENT DOCUMENTS

| | | | |
|---|---|---|---|
| 2017/0336214 | A1 | 11/2017 | Lynch |
| 2019/0333389 | A1 | 10/2019 | Wang |
| 2021/0150799 | A1 | 5/2021 | Yang et al. |

FOREIGN PATENT DOCUMENTS

| | | | | |
|---|---|---|---|---|
| CN | 112017189 A | 12/2020 | | |
| EP | 2952993 A1 * | 12/2015 | .......... | G01S 17/931 |
| WO | 2021097409 A1 | 5/2021 | | |

OTHER PUBLICATIONS

International Search Report and Written Opinion of the International Searching Authority in corresponding International Application No. PCT/EP2022/059927 mailed Nov. 15, 2022 (14 pages).

(Continued)

*Primary Examiner* — Michael D Lang
(74) *Attorney, Agent, or Firm* — Jeffri A. Kaminski; Venable LLP

(57) ABSTRACT

A method of controlling an autonomous vehicle which is movable on a surface, comprising: initializing an occupancy grid with reference map data, each cell in the occupancy grid being associated with a plurality of obstacle hypotheses and respective probability scores; repeatedly obtaining measurement data from sensors; associating the obtained measurement data with corresponding cells; in each of said corresponding cells, updating the probability score of at least one obstacle hypothesis in accordance with the obtained measurement data; outside said corresponding cells, evolving the probability scores based on the time elapsed since a latest update of these probability scores; and controlling the autonomous vehicle on the basis of the occupancy grid. In some embodiments, the probability score is updated based on a comparison of a measured elevation and an elevation indicated by the reference map data.

13 Claims, 7 Drawing Sheets

(56) References Cited

OTHER PUBLICATIONS

International Preliminary Report on Patentability in corresponding International Application No. PCT/EP2022/059927 mailed Oct. 13, 2023 (6 pages).

Sebastian Thrun et al; “Probabilistic Robotics”; Intelligent Robotics and Autonomous Agents series; MIT Press, Aug. 19, 2005—Technology & Engineering; ISBN: 9780262201629; 492 pages.

* cited by examiner

SYSTEM AND METHOD FOR CONTROLLING AN AUTONOMOUS VEHICLE USING A PROBABILISTIC OCCUPANCY GRID

CROSS-REFERENCE TO RELATED APPLICATIONS

This application is a U.S. National Stage application of PCT/EP2022/059927, filed Apr. 13, 2022 and published on Oct. 19, 2023, as WO 2023/198286, all of which is hereby incorporated by reference in its entirety.

TECHNICAL FIELD

The present disclosure relates to the field of autonomous vehicle control. in particular, it presents a system and method for controlling an autonomous vehicle using a probabilistic occupancy grid.

BACKGROUND

An occupancy grid is a frequently used tool in the controlling of driverless vehicles or robots that move in incompletely known environments. Conceptually, the surface (ground, road, runway, terrain, floor etc.) on which the vehicle is moving is discretized into cells, which are annotated with an 'occupied' or 'free' status. In the field of autonomous vehicles, where several different varieties and definitions of occupancy grids coexist. For example, an occupancy grid can be a mapping from the grid cells to respective drivability scores. Different values of the drivability score can represent that an obstacle is present in the grid cell, that the grid cell is safe to drive on, or that the exact drivability is uncertain. Alternatively, an occupancy grid can be a mapping from the grid cells to random variables that indicate the presence of obstacles at those locations. Further, the user community has accumulated significant experience of occupancy grids, and very efficient assisting software functions are available today, including geometric lookup algorithms.

For a general introduction to occupancy grids, reference is made to S. Thrun et al., *Probabilistic Robotics* (*Intelligent Robotics and Autonomous Agents series*), MIT Press, 2005, ISBN 9780262201629.

It is customary to initialize an occupancy grid with map data, which may be provided by a geographic information system (GIS). Use cases are not uncommon where GIS data or other initialization data in the occupancy grid needs to be updated after the vehicle control has begun. The updating may be pointwise in time (e.g., at scheduled or triggered refresh events) or continuous, and it may be based on data from fixed or vehicle-carried sensors, such as radar, lidar, optical and acoustic sensors. In use cases of this kind, the occupancy grid has repeatedly proved to be a suitable medium for absorbing such subsequent data, even from multiple data sources, and for integrating it with the information that the occupancy grid already holds. Sensor fusion and SLAM (simultaneous localization and mapping) are technologies related to the processes of integrating and combining data.

WO2021097409A1 discloses a computer-based method for generating artificial sensor data suitable for training an autonomous vehicle before it is released to operate in a real-world traffic setting. The disclosed method uses sensor data, such as optimal camera and lidar data, collected while an autonomous vehicle passes once or multiple times through a scene of interest. In the method, a grid is generated for each surfel (surface element) in the surfel map. The grid may have a plurality of grid cells, e.g., a square grid centered on the point centroid of the surfel. A generative model implemented as a generative adversarial network (surfel-GAN) is used that converts surfel renderings to more realistic-looking images. After application of the surfel-GAN, the gaps, holes and other spaces that are missing in the first image are automatically filled. Other objects, including roads, traffic lights, lamp posts and signs, become clearer and more realistically portrayed. Shape and size parameters are used to specify the shape and size of a surfel, and its orientation can be represented by a normal vector.

SUMMARY

One objective of the present disclosure is to make available techniques for controlling an autonomous vehicle in an incompletely known environment, which is being explored by means of sensors. A further objective is to balance the influence of new and relatively less recent measurement data from the sensors in the vehicle-control process. A further objective is to reduce the risk that vehicle-control decisions are based on outdated measurement data and the risk that they become uncertain or hazardous as a result. A further objective is to implement such vehicle-control techniques on the basis of an occupancy grid. A still further objective is to develop the customary two-valued definition of the occupancy state in the occupancy grid ('occupied' or 'free') into a possibility of formulating and evaluating multiple parallel hypotheses about a particular grid cell. An overreaching aim of this disclosure, finally, is to propose such control techniques that have modest computational requirements, i.e., techniques that can be expected to contribute a limited amount of processor load and thereby leave computational resources available for other tasks on the same system.

At least some of these objectives are achieved by the invention as defined by the independent claims. The dependent claims relate to advantageous embodiments of the invention.

In a first aspect, there is provided a method of controlling at least one autonomous vehicle which is movable on a surface. The method comprises: initializing an occupancy grid with reference map data, wherein the occupancy grid comprises a plurality of cells, each of which represents a portion of the surface and is associated with a plurality of obstacle hypotheses and respective probability scores; repeatedly obtaining measurement data from one or more sensors; associating the obtained measurement data with corresponding cells in the occupancy grid; in each of said corresponding cells, updating the probability score of at least one of the obstacle hypotheses in accordance with the obtained measurement data; outside said corresponding cells, evolving the probability scores based on the time elapsed since a latest update of these probability scores; and controlling the autonomous vehicle(s) on the basis of the occupancy grid.

In the present disclosure, an "obstacle" is to be understood broadly, as anything that could impair or prevent normal vehicle movement (e.g., pothole, snow, ice, pollutant, blocking physical object, terrain, absence of road, absence of road material within nominal extent of the road surface). A "probability score" can be any quantity that provides sufficient guidance, in the use case at hand, for the autonomous vehicle control to be performed. The probability score may have one maximum value (e.g., corresponding to statements in natural language such as 'hypothesis proved'), one minimum value (e.g., 'hypothesis disproved') and one neutral value (e.g., 'hypothesis uncertain'). The probability score may be represented as a discrete or continuous numerical variable. In particular, the probability score may be defined to have values in the real interval [0,1]; even with this definition, however, the probability score need not correspond faithfully to a probability in a statistical sense. On this basis, it is understood that the hypothesis "This grid cell contains usable road", or another favorable hypothesis, can be expressed as an mirrored, negative hypothesis "Absence of road". Then, if a vehicle controller requires the favorable hypothesis to have a probability score of at least $1-\varepsilon$ (for some configurable constant $\varepsilon>0$), this is equivalent to requiring the negative hypothesis to have a probability score of at most $\varepsilon$.

A particularly advantageous characteristic of the method according to the first aspect is its ability to balance the influence of new and relatively less recent measurement data from the sensors. This is achieved by the fact that, when new measurement data is obtained, each cell in the occupancy grid undergoes either a probability score update or a probability score evolution. The evolving of a probability score may reflect the aging of the measurement data which was used for the latest update of this probability score. In practical implementations, there are at least two ways of establishing whether new measurement data has been obtained:

(a) system time is segmented into periods of length T is defined, and it is checked after the expiry of each period which cells have been associated with measurement data; or (b) it is checked after each execution of the step of repeatedly obtaining measurement data (e.g., a polling of the available sensors) which cells have been associated with the measurement data.

Option (b) can be implemented whether the step of repeatedly obtaining measurement data is executed on a periodic basis or in an event-triggered fashion. In particular, the method may be implemented such that the step of obtaining measurement data and at least some of the subsequent steps are repeated periodically or in an event-triggered fashion.

In some embodiments, a probability score is evolved by gradually approaching it to a predefined limit value. The limit value may for example represent a non-confirmed obstacle hypothesis (neutral value, such as 0.5). A vehicle controller is likely to consider grid cells with a non-confirmed obstacle hypothesis as uncertain and its decision-making will tend to be cautious, for the benefit of safety.

In further developments of these embodiments, a first predefined limit value applies to cells outside a field-of-view of the sensors from which the measurement data was obtained, and a second predefined limit value applies to cells in said field-of-view. The first predefined limit value may represent a non-confirmed obstacle hypothesis (e.g., neutral value, such as 0.5), and the second predefined limit value may represent a disproved obstacle hypothesis (e.g., minimum value, such as 0.0).

In some embodiments, the probability score is evolved in any intervening cells between said corresponding cells and respective sensor-position cells. In the terminology of the present disclosure:

measurement data includes points in space where reflection, scattering and/or diffraction has been recorded by the one or more sensors;

corresponding cells can be computed as projections of points in space on the occupancy grid (e.g., discretizing x, y coordinates of the space coordinates of the measurement data, so that they correspond to grid cells, and discarding z coordinate);

a sensor-position cell is a projection of the sensor position on the occupancy grid; and intervening cells are understood to be cells on lines connecting one of the corresponding cells with the sensor-position cell of the active sensor.

Intervening cells are thus not part of corresponding cells, which may lead to significant computational savings. Indeed, a large amount of grid cells undergo the computationally cheaper probability-score evolution rather than the probability score update.

In some embodiments, the updating of the probability scores in the corresponding cells (i.e., those which have been associated with measurement data) is based on a comparison of the measurement data and the reference map data. The comparison may be configured to establish whether the measurement data confirms (or at least is compatible with) the obstacle hypothesis, in which case the probability score is increased. The comparison may relate to visual features or other physical and chemical quantities recorded by the sensors.

Especially, such a comparison of the measurement data and the reference map data may refer to the measured elevation according to the measurement data and an elevation according to the reference map data. The case where the measured elevation is equal to the elevation according to the reference map data may be understood to disprove (i.e., not support) any obstacle hypotheses where the reference map indicates road. The case of equal elevation may be understood to support a surface-type obstacle hypothesis (e.g., ice, liquid pollutant). The case where the measured elevation is greater than the elevation according to the reference map data may be understood to prove an object-type obstacle hypothesis (e.g., presence of a physical object). Finally, the case where the measured elevation is less than the elevation according to the reference map data may be understood to prove a hole-type obstacle hypothesis (e.g., presence of a pothole, absence of road material). Experiments and simulations have revealed that elevation is an accurate yet computationally lean indicator which could ensure fast convergence to a reliable occupancy grid.

In some embodiments, the updating of the probability scores includes applying a recursive rule. The recursive rule may for example be a version of Bayes' rule.

In some embodiments, the probability scores are updated in accordance with a predefined scoring model. The scoring model may for example reflect the reliability and accuracy of the sensors used; if the sensors are error-prone and/or the observation conditions are poor, the support will be relatively weaker. The scoring model may be dependent on a (temporal) update rate and/or a spatial measurement density of the sensor. The scoring model may furthermore be specific to the respective obstacle hypothesis and/or specific to the sensor from which the measurement data has been obtained. In embodiments utilizing a Bayes' rule, the evaluation of this rule may refer to aspects of the scoring model.

In some embodiments, the step of controlling the autonomous vehicle includes aggregating the cell-wise probability scores of the obstacle hypotheses into an occupancy probability. The occupancy probability, just like the probability scores, need not correspond faithfully to a probability in a statistical sense. It may be used for an evaluation against a configurable threshold which represents the degree of certainty required by the operator to consider a cell to be drivable, and this will confirm that it is safe to plan a vehicle trajectory through the cell. In further developments of such embodiments, the aggregating of cell-wise probability scores is restricted to cells on a tentative trajectory of the vehicle or to cells in a vicinity of the vehicle.

In a second aspect, there is provided a vehicle controller configured to control at least one autonomous vehicle movable on a surface. The autonomous vehicle is controlled on the basis of an occupancy grid comprising a plurality of cells, each of which represents a portion of the surface and is associated with a plurality of obstacle hypotheses and respective probability scores. The vehicle controller comprises: an input interface for receiving measurements from one or more sensors; processing circuitry; and an output interface for supplying commands to the autonomous vehicle. The processing circuitry of the vehicle controller is configured to perform the method of the first aspect.

The further relates to a computer program containing instructions for causing a computer, or the vehicle controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
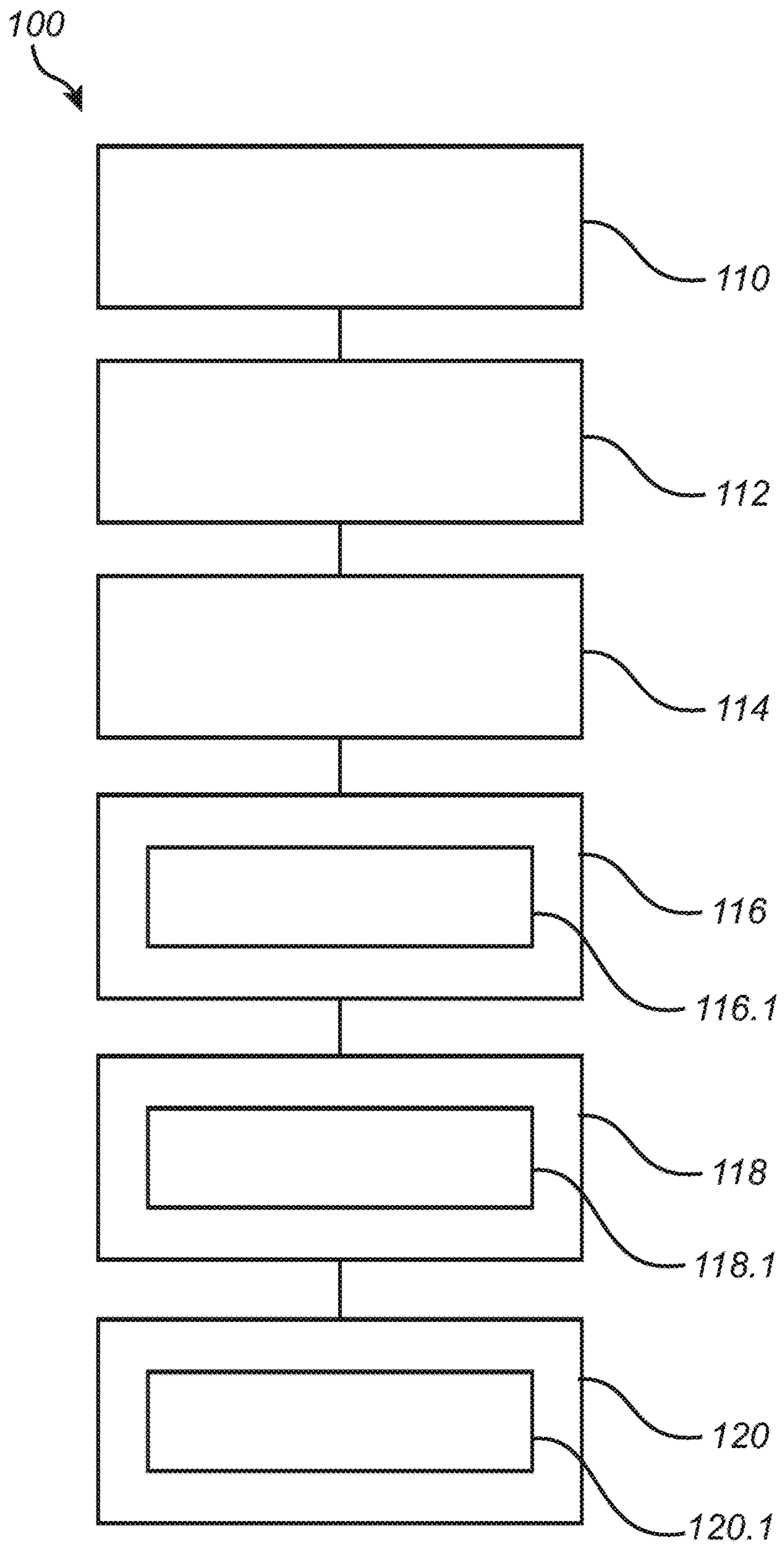
FIG. 1 is a flowchart of a method of controlling an autonomous vehicle, in accordance with embodiments herein.

FIG. 1 is a flowchart of a method 100 of controlling at least one autonomous vehicle 210 which is movable on a surface. The steps of the method 100, to be described below, may be executed by a general-purpose computer equipped with suitable communication interfaces, by which the computer is able to exchange data with sensors and actuators. In particular, the method 100 may be implemented in a vehicle controller 300 of the type schematically illustrated in FIG. 3. More precisely, the vehicle controller 300 includes an input interface 310 for receiving measurements from one or more sensors 250, an output interface 330 for supplying commands to the autonomous vehicle 210 and processing circuitry 320 for providing the commands on the basis of the measurements. In the embodiment illustrated in FIG. 3, the vehicle controller 300 further comprises an optional operator interface 340 configured for human-machine interaction; the operator interface 340 may be used for system setup, system maintenance, troubleshooting, overriding manual control of the vehicle 210 and similar purposes. In further embodiments, the processing circuitry 320 is configured to delegate some of its computations to a networked (or cloud) processing resource, wherein the vehicle controller 300 may be exchanging computational tasks and resulting output with the networked processing resource over a wireless or wired communication interface.

Figure 2:
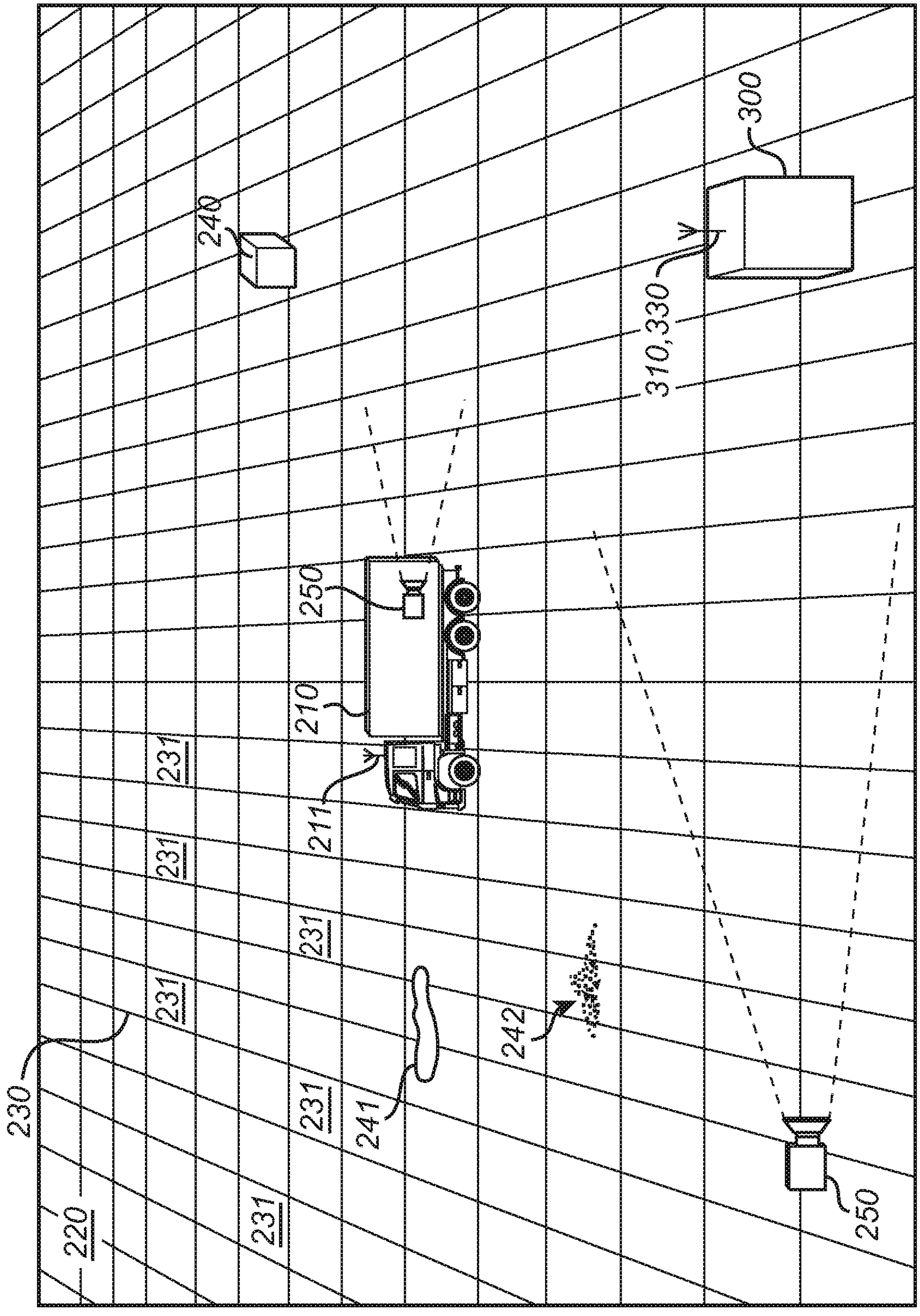
FIG. 2 is a perspective view of a surface on which a vehicle is movable and where different types of obstacles are present.

As shown in FIG. 2, the sensors 250 supplying the measurement data are preferably arranged at, near or above the surface 220 on which the autonomous vehicle 210 moves. The sensors 250 may be fixed (like the sensor 250 in the lower left corner of FIG. 2) or vehicle-carried (like the sensor 250 arranged on the autonomous vehicle 210). Further, each sensor 250 may have a variable or fixed orientation; viewing angles suitable for establishing the presence or absence of obstacles may include directions approximately parallel to the surface 220, directions orthogonal to the surface 220 or oblique directions between these. The sensors 250 may be configured to apply at least one of the following measuring principles: optical, electromagnetic reflection, electromagnetic scattering, electromagnetic diffraction, lidar, color-depth sensing (e.g., RGB-D), millimeter-wave radar, ultra-wideband radar. The sensors 250 are assumed to be properly calibrated when the method 100 is to be executed. Cases of poor calibration or malfunctioning could, in some embodiments, be discovered and rectified by the enforcement of a so-called elevation condition to be described below.

It is recalled that an “obstacle” is to be understood broadly in the context of the present disclosure, as anything that could impair or prevent normal vehicle movement, and they may correspond to object-type, surface-type and hole-type obstacles hypotheses. In FIG. 2, the following obstacles are visible: a physical object 240, liquid pollution 241, pothole 242. Further examples of obstacles include snow, ice, solid or powdery pollutants, terrain, absence of road, absence of road material within the nominal extent of the road surface. The autonomous vehicle 210 may be a road vehicle, in particular a truck, a bus or construction-equipment vehicle. It may be a rigid or articulated vehicle, or a vehicle combination with two or more units.

Figure 3:
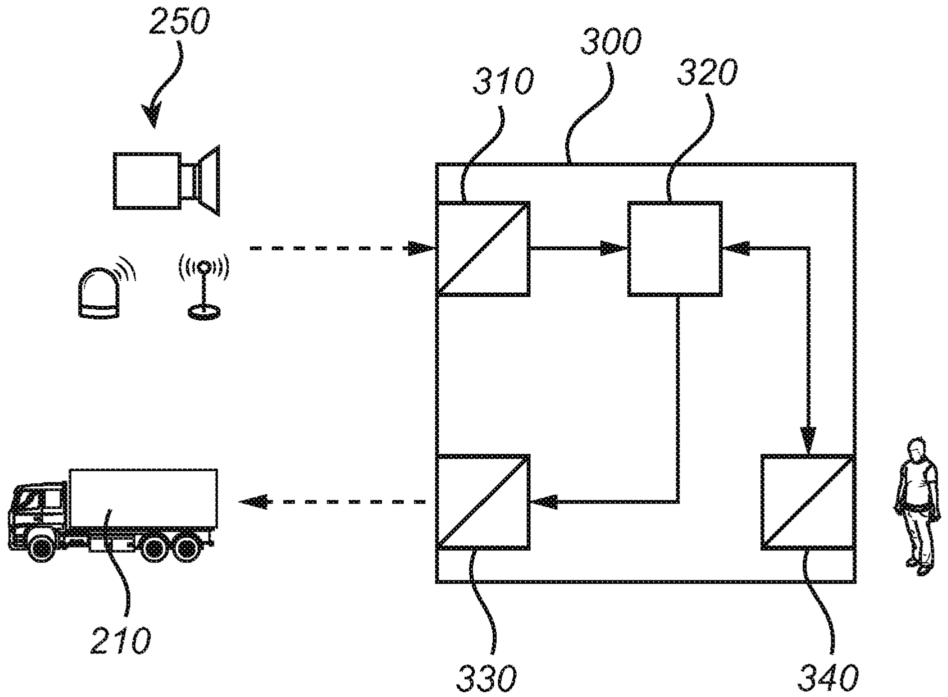
FIG. 3 is a block diagram of a vehicle controller in accordance with embodiments herein, which receives measurement data from sensors and generates control signals destined for a vehicle.

FIG. 2 further includes an external view of the vehicle controller 300, which was previously discussed with reference to FIG. 3. In FIG. 2, the vehicle controller's 300 input and output interfaces 310, 330 are implemented as a single communication interface, which is arranged within coverage of a corresponding wireless interface 211 mounted on the vehicle 210 to be controlled and within coverage of further wireless interfaces (not shown) on the sensors 250. It is noted that at least some of the sensors 250 could alternatively provide their measurement data to the vehicle controller 300 over wired links.

Returning to the execution flow shown in FIG. 1, a first step 110 of the method 100 includes initializing an occupancy grid 230 comprises a plurality of cells 231, each of which represents a portion of the surface. The occupancy grid 230 is initialized with reference map data and the cells are associated with a plurality of obstacle hypotheses and respective probability scores.

The segmentation of the surface 220 into a plurality of cells 231, which represent respective portions of the surface and collectively form an occupancy grid 230, is symbolically indicated in FIG. 2. The granularity of the occupancy grid 230 is not essential to the present invention but may vary between different embodiments. For road vehicles, the cell area may be of the order of 0.01 $m^2$, 0.1 $m^2$ or 1.0 $m^2$. Cell shapes susceptible of homothetic packing are preferred, such as hexagonal and rectangular. Areas which are non-drivable from the outset (e.g., water) need not be included in the occupancy grid 230 at all. Alternatively, the non-drivable areas may be included in the occupancy grid 230 and made recognizable by the absence of an assigned elevation value (z coordinate).

A grid cell may be identified by a pair of integer indices (X, Y) which are related to the cartesian coordinates of the cell (x, y, z) by the following discretization function:

$$(X, Y) = f(x, y, z) = \left(\left\lfloor \frac{x}{x_0} \right\rfloor, \left\lfloor \frac{y}{y_0} \right\rfloor\right)$$

where the constants $x_0$, $y_0>0$ are respective segmentation granularities and $\lfloor \cdot \rfloor$ denotes rounding to the nearest lower integer (floor function). The discretization is independent of the z coordinate and therefore not invertible in general. The cartesian coordinates of a grid cell may refer to a predefined reference point in the cell (e.g., the center, the northwest corner). Alternatively, the discretization is used to define the grid cells, i.e., a grid cell $C_{(X_1,Y_1)}$ shall be the set of all points on the surface S that the discretization function maps to the same integer indices:

$$C_{(X_1,Y_1)} = \{(x, y, z) \in S: (X_1, Y_1) = f(x, y, z)\}.$$

The processing circuitry 320 of the vehicle controller 300 may be configured to maintain a data structure representing the occupancy grid 230. In addition to geometric indications about the cells 231, the data structure may include reference map data. The entering of the reference map data into the data structure may be referred to as an initialization. The reference map data may include locations of nominally drivable portions of the surface 220 (e.g., roads, car parks). The reference map data may further include topographic indications; in such embodiments where probability scores are to be updated on the basis of a comparison of elevations, the topographic indications include elevation (z coordinate). Some authors refer to an occupancy grid with these characteristics as a 2.5-dimensional (2.5D) height grid. Map data may be obtained from commercial geographical information systems (GISs) or from open data sources, such as the OpenStreetMap Foundation, Cambridge, United Kingdom.

In this data structure, furthermore, each cell 231 of the occupancy grid 230 is associated with a plurality of obstacle hypotheses and respective probability scores. While the probability scores can be independently assigned for each cell 231, the occupancy grid 230 may be set up in such manner that all cells share a common set of obstacle hypotheses. Alternatively, different cells 231 are associated with different sets of obstacle hypotheses, e.g., when it is evident a priori that a certain type of obstacle can never occur in a certain area, it is not necessary to initialize a corresponding obstacle hypothesis. As mentioned initially, a “probability score” can be any quantity that provides sufficient guidance for the autonomous vehicle control to be performed. The probability score may have one maximum value (‘hypothesis proved’), one minimum value (‘hypothesis disproved’) and one neutral value (e.g., ‘hypothesis uncertain’). The probability score may be represented as a discrete or continuous numerical variable. In the example to be described hereinafter, the probability score is defined to have values in the real interval [0,1].

In a second step 112 of the method 100, measurement data is obtained from the one or more sensors 250. Suitable types of sensors 250 and ways of arranging them relative to the surface 220 have been discussed above with reference to FIG. 2. The entity executing the second step 112 may obtain the measurement data by requesting it from the sensors 250, or may receive the measurement data in communications sent to it by the sensors 250 on a periodic or event-triggered basis. A still further option is to use a publication-subscription (PubSub) arrangement, wherein the sensors 250 are configured to deposit the measurement data in a shared memory. The measurement data may include points in space where reflection, scattering or diffraction has been recorded by the one or more sensors; the points may be identified in terms of their cartesian coordinates. A collection of such points may be referred to as a point cloud.

The second step 112 is repeated within a single execution of the method 100. The second step 112 may be repeated at predefined intervals, at scheduled points in time, whenever new measurement data is received from a sensor 250, or otherwise on an event-triggered basis. For example, a new execution of the second step 112 may be triggered if a quality indicator of the occupancy grid 230 falls below a predefined threshold. In some embodiments, the subsequent third 114, fourth 116 and fifth 118 steps (and optionally the sixth step 120) are repeated for each new execution of the second step 112.

Figure 6:
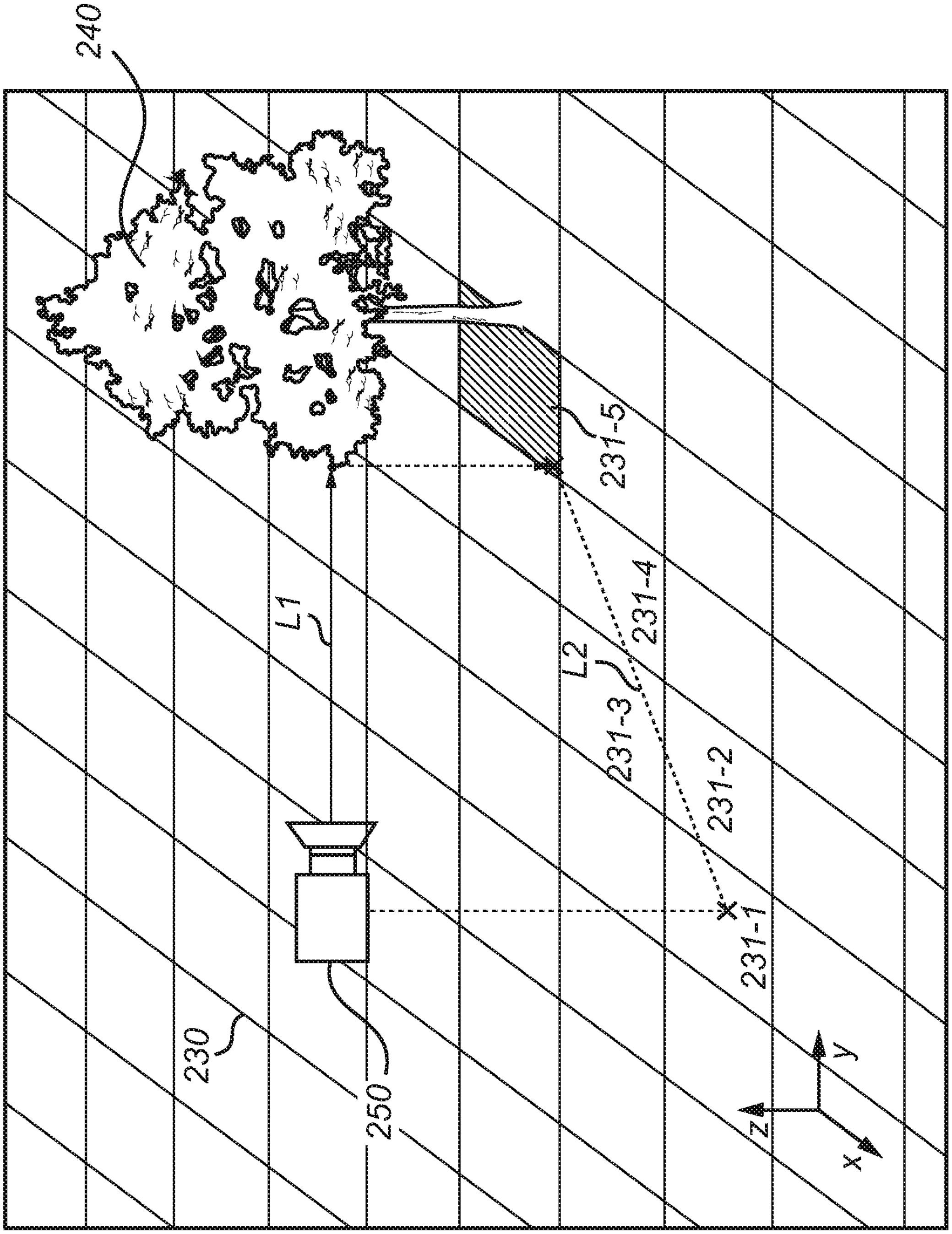
FIG. 6 illustrates, in a perspective view of a surface where a vehicle is movable, various geometric features of a sensor's capturing of measurement data and the resulting updating of probability score values in some grid cells.

In a third step 114 of the method 100, the obtained measurement data is associated with corresponding cells in the occupancy grid. An example of such an association is shown in FIG. 6, in which L1 is a line from the sensor 250 to a point on an obstacle 240 at which reflection, scattering or diffraction takes place. The corresponding cell 231-5, shown as hashed in FIG. 6, is the cell that contains the vertical (z-wise) projection of the reflection/scattering/diffraction point. The third step 114 may include mapping a reflection/scattering/diffraction point $(x_m, y_m, z_m)$ in the measurement data using the discretization function $f$ defined above, which returns a pair of integer indices $(X_m, Y_m)$ that identify said corresponding cell 231-5. The cell that contains the vertical projection of the sensor 250 is referred to as the sensor-position cell 231-1. The cells intersected by the line L2, which connects the respective vertical projections of the sensor position and the reflection/scattering/diffraction point are referred to as intervening cells 231-2, 231-3, 231-4. Alternatively, the intervening cells may be defined as all cells of the occupancy grids that are intersected by lines that connect the sensor-position cell and any of the corresponding cells.

In a fourth step 116, which is performed for each of the corresponding cells (231-5 in FIG. 6), the probability score of at least one of the obstacle hypotheses is updated in accordance with the obtained measurement data. In some embodiments of the method 100, the probability scores are updated in accordance with a predefined scoring model. The scoring model may for example reflect the reliability and accuracy of the sensors 250 used; if the sensors are error-prone and/or the observation conditions are poor, the impact of new measurement data will have a relatively weaker impact on the probability scores. The scoring model may be dependent on a (temporal) update rate and/or a (spatial) measurement density of the sensor. The scoring model may furthermore be specific to the respective obstacle hypothesis and/or specific to the sensor 250 from which the measurement data has been obtained. To set up a new scoring model, an implementer may rely on theoretical reasoning or earlier experience to initialize the scoring model with numerical values (ansatz). The model may then subsequently be refined and improved, from a structural or quantitative point of view, on the basis of simulations or experiments.

In some embodiments of the method 100, the updating of the probability scores includes applying 116.1 a recursive rule. The recursive rule may for example be a version of Bayes' rule:

$$P(H \mid E) = \frac{P(E \mid H)P(H)}{P(E)},$$

where P(H) is the probability score of the obstacle hypothesis H before the updating (i.e., prior probability, initial degree of belief in the obstacle hypothesis), P(H|E) is this probability score after incorporating the measurement data, and the quotient P(E|H)/P(E) can be interpreted as the support that the measurement data E provides for the obstacle hypothesis H according to a suitable scoring model. As such, the scoring model may include a numerical value of the quotient P(E|H)/P(E) for each obstacle hypothesis.

In particular, the updating of the probability scores may be based on a comparison of an elevation $z_m$ measured by one of the sensors 250 and an elevation $z_{map}$ indicated by the reference map data. More precisely, the updating of the probability score is conditional upon a topography condition or an elevation condition specifically. The topography condition ensures that the measurement data is, broadly speaking, compatible with the obstacle hypothesis. Different elevation conditions may apply for a hole-type, surface-type or hole-type obstacle hypothesis, as exemplified in Table 1.

In a fifth step 118, which is performed for each cell of the occupancy grid 230 except for the corresponding cells, the probability scores are evolved based on the time elapsed since the most recent update of the probability scores in the cell. (In some embodiments, the fifth step 118 can be executed for the corresponding cells too, which could lead to a simpler implementation. The updating of the probability scores is expected to quantitatively outweigh the effect of the evolving.) Instead of the costlier fourth step 116, the intervening cells 231-2, 231-3, 231-4 are processed in accordance with the fifth step 118, which may lead to computational savings.

The evolution of the probability scores may include gradually approaching 118.1 each probability score to a predefined limit value. In some embodiments of the method 100, a first predefined limit value $$P_0^{(1)}$$

applies to cells outside a field-of-view of the sensors from which the measurement data was obtained, and a second predefined limit value $$P_0^{(2)}$$

applies to cells in said field-ot-view. In such embodiments, the first predefined limit value may represent a non-confirmed obstacle hypothesis:

$$P_0^{(1)} = 0.5.$$

The second predefined limit value may represent a disproved obstacle hypothesis:

$$P_0^{(2)} = 0.0.$$

Figure 4:
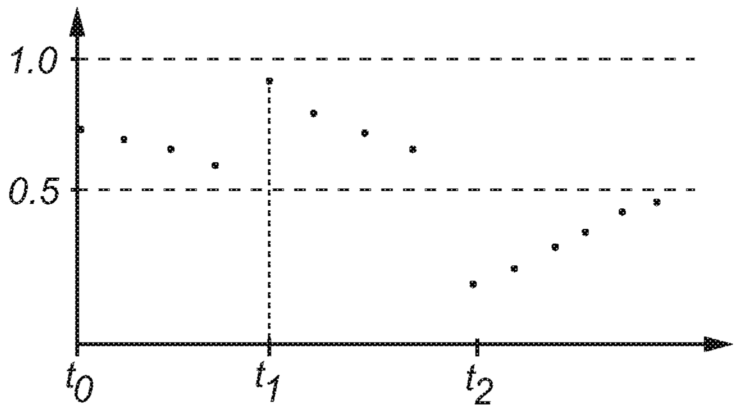
FIG. 4 illustrates a time evolution of a probability score for an obstacle hypothesis associated with a grid cell, wherein the probability score approaches the value 0.5 in the absence of new measurement data.

FIG. 4 shows, as a function of time, the probability score of an obstacle hypothesis for a cell of the occupancy grid 230. The initial value at time to is approximately 0.75. The cell is associated with new measurement data (i.e., it becomes a corresponding cell) at times $t_1$ and $t_2$, at which points it is assigned the values 0.9 and 0.2. In the time periods between to, $t_1$ and $t_2$ and after $t_2$, the probability score tends to a limit value 0.5. This reflects the empirical fact that measurement data from a time-varying system becomes less trustworthy as the measurement data ages. The limit value 0.5 is typical of cells outside the field-of-view of a sensor 250.

Figure 5:
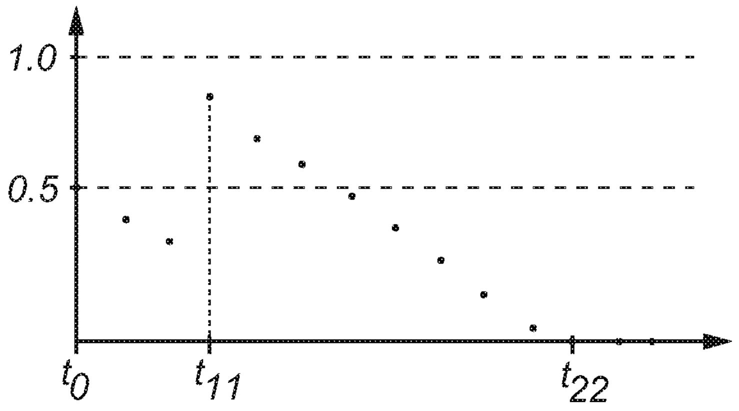
FIG. 5 illustrates a time evolution of a probability score for an obstacle hypothesis associated with a grid cell, wherein the probability score approaches the value 0.0 in the absence of new measurement data.

Similarly, FIG. 5 shows the probability score of a different obstacle hypothesis for the same or a different cell of the occupancy grid. The cell is associated with new measurement data at time $t_{11}$. In time periods where no new measurement data is received, the probability score tends towards the limit value 0.0. The probability score reaches the limit value at time $t_{22}$ and remains thus until new measurement data is received. The limit value 0.0 is characteristic of cells in the field-of-view of the sensor 250.

If movable sensors 250 or sensors 250 with variable orientation (e.g., pan-tilt-zoom camera) are used, then, as a consequence of the field-of-view condition, the probability score for the same obstacle hypothesis and the same grid cell can tend towards different limit values in different time intervals. This is unlike the cases depicted in FIGS. 4 and 5. It occurs if the sensor 250 is moved or reoriented in such manner that the grid cell enters or leaves the field-of-view. Whether or not a grid cell is in a sensor's 250 field-of-view can be determined by elementary geometric calculations based on the sensor's 250 position, orientation, angle of view. Information regarding the local elevation of the surface 220 may be used to refine such a calculation.

Computationally, the evolution of the probability scores can be implemented in any suitable manner. If the second step 112 is repeated on a periodic basis (i.e., in time segments of a predefined length T each), the evolution can be performed by applying an additive or multiplicative constant, which is identical for each time segment. For example, the probability score can be caused to tend to 0.0 by reducing it by a certain percentage every time segment. A generally applicable evolution equation may be formulated as follows:

$$P(H;t)=\eta(t-t_0)P(H;t_0)+(1-\eta(t-t_0))P_0^{(N)},$$

where P (H; t) is the probability score for hypothesis H and time t; $t_0$ is the time of the latest update of the probability score;

$$P_0^{(N)}$$

is the applicable limit value; and $\eta(t)$ is a monotonically decreasing function such that $\eta(0)=1$ and $$\lim_{t\to\infty}\eta(t)=0.$$

The function $\eta(t)$ may have a linear or nonlinear dependence on time. For example, it may be decreasing exponential function (e.g., $\eta(t)=e^{-bt}$, b>0) or an affine function that goes to 0 in finite time. The above evolution equation has an inherent bookkeeping of the time elapsed and can thus be used even if the second step 112 is not repeated periodically.

Table 1 summarizes the foregoing discussion regarding the processing of the probability scores in the fourth and fifth steps 116, 118. The left-hand side relates to updating based on measurement data, and the right-hand side relates to evolution with time. Table 1 relates to embodiments where the updating of probability scores is conditional upon an elevation condition. If the elevation condition is not fulfilled, the probability may in some embodiments be left unchanged. In other embodiments, the probability score is evolved with time—as if no measurement data had been received—if the elevation condition is not fulfilled.

TABLE 1

Processing of probability scores in steps 116 and 118

| | Measurement | | No measurement | |
|---|---|---|---|---|
| Obstacle type | Elevation condition | Updates towards | In field of view | Evolves towards $(P_0^{(N)})$ |
| Hole-type | $z_m < z_{map}$ | 1.0 | Yes | 0.0 |
| | | | No | 0.5 |
| Surface-type | $z_m = z_{map}$ | 1.0 | Yes | 0.0 |
| | | | No | 0.5 |
| Object-type | $z_m > z_{map}$ | 1.0 | Yes | 0.0 |
| | | | No | 0.5 |

In a sixth step 120 of the method 100, data from the occupancy grid is used to control the autonomous vehicle 210. The data may for example be used to determine an obstacle-free trajectory for the vehicle 210. Alternatively, the vehicle trajectory to be generated may be allowed to pass via certain types of obstacles though subject to a penalty (e.g., hole-type obstacle which is likely to increase mechanical wear) or subject to a requirement to reduce the speed and/or or limit the maximum curvature (e.g., surface-type obstacle where the road-wheel friction is expected to be poorer).

The data from the occupancy grid may be preprocessed in various ways to be more suitable for use in controlling the autonomous vehicle 210. For example, the cell-wise probability scores for the plural obstacle hypotheses may be aggregated 120.1 into one occupancy probability value for each cell, $P_{occ}$. The occupancy probability may be used for an evaluation against a configurable threshold which represents the degree of certainty required by the operator to consider a cell as drivable. An example requirement may be $P_{occ}\le\varepsilon$, where $\varepsilon>0$ is a configurable constant representing the required degree of certainty for considering the grid cell to be drivable. The occupancy probability may be obtained by combining the probability scores for all obstacle hypotheses that are associated with the cell. The combining may be performed based on a simplifying assumption that the obstacle hypotheses are mutually independent. Letting $P(H_1)$, $P(H_2)$, . . . denote the probability scores of these obstacle hypotheses, a first example criterion for considering a grid cell to be safe to drive in may be formulated as $$\sum_{i\ge 1}P(H_i)\le\varepsilon$$

with $\varepsilon$ as above. A second example criterion may be expressed as $$1-\prod_{i\ge 1}(1-P(H_i))\le\varepsilon.$$

The left-hand side of the first example criterion may be interpreted as a probability score for the event 'any single obstacle hypothesis is fulfilled', and the left-hand side of the second example criterion may be interpreted as a probability score for the event 'at least one obstacle hypothesis is fulfilled'. The second example criterion is likely more exact but could require more processing resources.

The necessary processing load may be limited to some extent if said substep of aggregating 120.1 is restricted to cells that are likely to be visited by the autonomous vehicle 210, e.g., cells which lie on a tentative trajectory, which are relatively close to the autonomous vehicle 210 and/or which are, by and large, ahead of the vehicle.

As mentioned, the method 100 can be implemented such that the first step 110 of obtaining measurement data and at least some of the subsequent steps are repeated periodically or in an event-triggered fashion. The controlling step 120 can be executed independently of the repetition loop of steps 112, 114, 116, 118, whose purpose it is to maintain the data held in the occupancy grid. The controlling step 120, for its part, may be executed whenever the operator requests a vehicle movement.

The described method 100, at least in some embodiments, have several significant benefits: Measurement data expressed as a point cloud can be used for updating probability scores virtually without any preprocessing, so that each reflection/scattering/diffraction point has an immediate and autonomous effect on the probability scores. Measurement data on this form can be mapped to corresponding cells by the computationally lean discretization function $f$. The need for costly point-cloud preprocessing, including downsampling, pruning, denoising and similar operations, is reduced or eliminated. The probability score for each obstacle hypothesis is systematically gravitated (i.e., evolved as a function of elapsed time) towards a specific gravitation target (i.e., limit value), which reflects model awareness based on absent measurements. Costly ray-tracing can be altogether avoided. The probability scores in intervening cells can be processed by cheap time evolution rather than actual updating.

Figure 7:
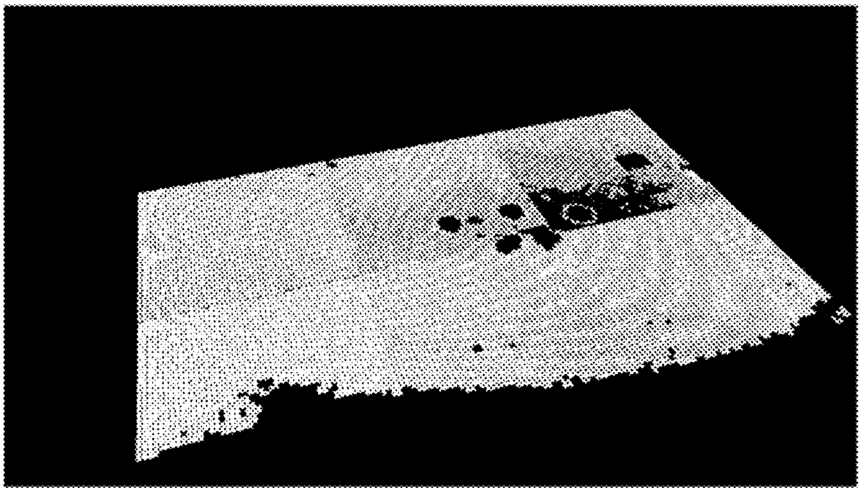
FIG. 7 is a perspective view of an example occupancy grid initialized with reference map data, in which the cell height corresponds to elevation and a grouping of cells into so-called tiles is visible.

FIG. 7 is a perspective view of an example occupancy grid that has been initialized with reference map data, which is visualized such that the cell height corresponds to elevation. Further, a grouping of cells into six so-called tiles is visible. The grouping of cells into tiles, while not essential to the present invention, could be used in implementations in order to facilitate memory management, rendering of graphics and similar internal housekeeping operations in the processing circuitry that executes the method 100.

Figure 8:
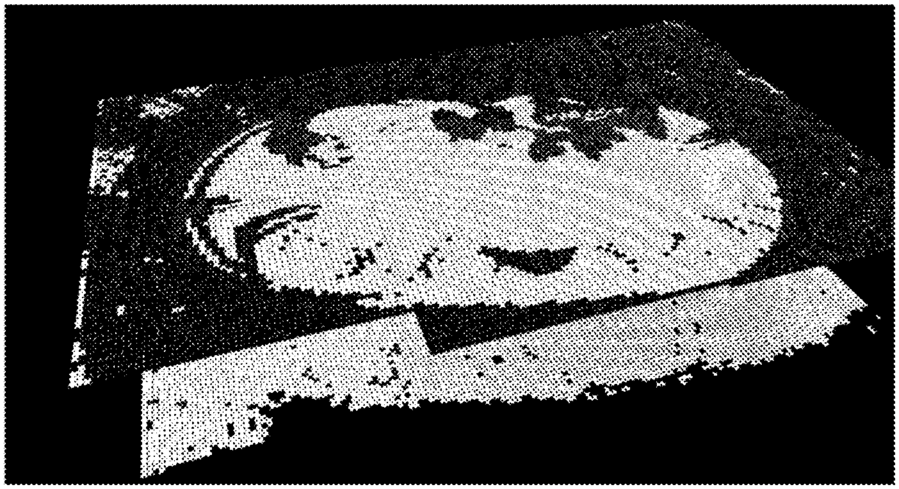
FIG. 8 corresponds to FIG. 7 which is covered by a further layer showing the updated probability scores of one obstacle hypothesis.

FIG. 8 corresponds to FIG. 7 which is covered by a further layer showing the updated probability scores of an object-type obstacle hypothesis, wherein the updating is based on measurement data. Lighter tones correspond to lower probability score values and darker tones correspond to higher values. The overall brighter, approximately stadium-shaped region corresponds to the field-of-view of the sensor which delivers the measurement data. Outside this region, all grid cells are processed by evolving the probability scores with time. Inside the stadium-shaped region, the grid cells are processed selectively depending on whether they are corresponding cells (i.e., associated with measurement data) or not, which leads to probability-score updating or probability-score evolving, respectively.

Figure 9:
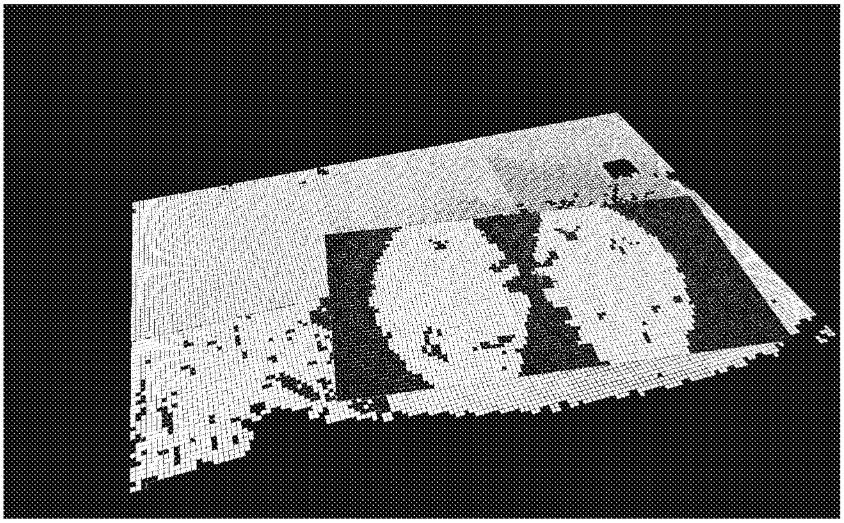
FIG. 9 corresponds to FIG. 7 partially covered by a layer showing a snapshot of all current probability scores (i.e., updated as well as evolved) of one obstacle hypothesis.

FIG. 9 corresponds to FIG. 7 partially covered by a layer showing a snapshot of all current probability scores (i.e., updated as well as evolved) of the obstacle hypothesis.

Figure 10:
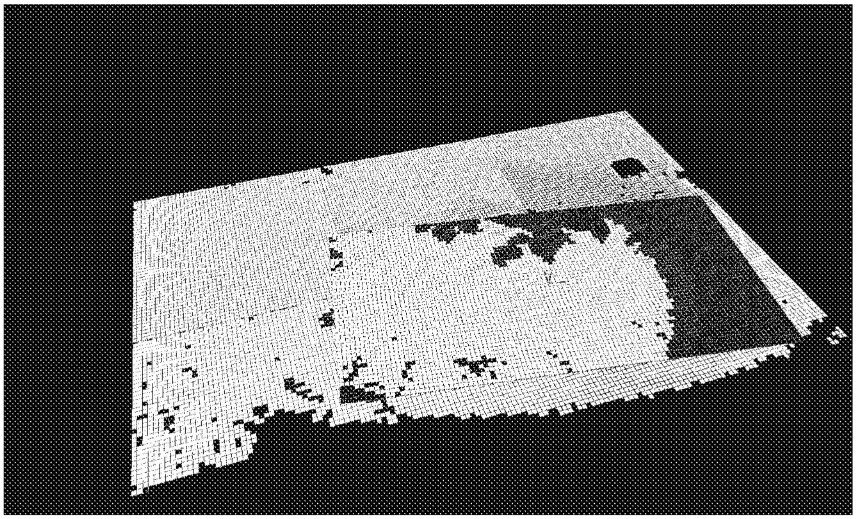
FIG. 10 corresponds to FIG. 7 partially covered by a layer showing a snapshot of an occupancy probability based on aggregated probability scores for all obstacle hypotheses.

FIG. 10 corresponds to FIG. 7 partially covered by a layer showing a snapshot of an aggregated occupancy probability score. (Conceptually, the aggregated occupancy probability score can be considered to be a generalized obstacle hypothesis "Surface is not drivable".) It is seen that the central region of the partially covering layer can be deemed to be substantially non-occupied (free from obstacles) with a high level of confidence, whereas (smaller) obstacles could be present at the near edge and (larger) obstacles are present at the far edge. The cells towards the left edge of the layer, which are outside the field-of-view of the sensor, have neutral probability score values. For these, no safe conclusion about the drivability can be made.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling an autonomous vehicle which is movable on a surface, comprising:

initializing an occupancy grid with reference map data, wherein the occupancy grid comprises a plurality of cells, each of which represents a portion of the surface and is associated with a plurality of obstacle hypotheses and respective probability scores;

repeatedly obtaining measurement data from one or more sensors;

associating the obtained measurement data with corresponding cells in the occupancy grid;

in each of said corresponding cells, updating the probability score of at least one of the obstacle hypotheses in accordance with the obtained measurement data;

outside said corresponding cells, evolving the probability scores based on the time elapsed since a latest update of these probability scores, wherein evolving the probability scores includes gradually approaching each probability score to a predefined limit value, wherein a first predefined limit value applies to cells outside a field-of-view of the sensors from which the measurement data was obtained, and a second predefined limit value applies to cells in said field-of-view, wherein the first predefined limit value represents that the obstacle hypothesis is non-confirmed, and wherein the second predefined limit value represents that the obstacle hypothesis is disproved; and controlling the autonomous vehicle on the basis of the occupancy grid.

2. The method of claim 1, wherein said evolving is performed on any intervening cells between said corresponding cells and respective sensor-position cells.

3. The method of claim 1, wherein the updating of the probability scores is based on a comparison of the measurement data and the reference map data.

4. The method of claim 3, wherein the updating of the probability scores is based on a comparison of a measured elevation and an elevation indicated by the reference map data.

5. The method of claim 1, wherein updating the probability scores includes applying a recursive rule.

6. The method of claim 1, wherein the probability scores are updated in accordance with a predefined scoring model, which is specific to the respective obstacle hypothesis and/or specific to the sensor from which the measurement data has been obtained.

7. The method of claim 6, wherein the scoring model is dependent on an update rate and/or a spatial measurement density of the sensor.

8. The method of claim 1, wherein the obstacle hypotheses in the occupancy grid include one or more of the following: pothole, snow, ice, pollutant, physical object, terrain, absence of road, absence of road material.

9. The method of claim 1, wherein the sensors apply at least one of the following measuring principles: optical, electromagnetic reflection, electromagnetic scattering, electromagnetic diffraction, lidar, color-depth sensing, millimeter-wave radar, ultra-wideband radar.

10. The method of claim 1, wherein said controlling the autonomous vehicle includes aggregating the cell-wise probability scores of the obstacle hypotheses into an occupancy probability.

11. The method of claim 10, wherein said aggregating is restricted to cells on a tentative trajectory of the vehicle or to cells in a vicinity of the vehicle.

12. A vehicle controller configured to control at least one autonomous vehicle movable on a surface, wherein the autonomous vehicle is controlled on the basis of an occupancy grid comprising a plurality of cells, each of which represents a portion of the surface and is associated with a plurality of obstacle hypotheses and respective probability scores, the vehicle controller comprising:

an input interface for receiving measurements from one or more sensors;

processing circuitry; and an output interface for supplying commands to the autonomous vehicle, wherein the processing circuitry is configured to perform the method of claim 1.

13. A non-transitory computer-readable storage medium, storing instructions to cause the vehicle controller to execute the steps of the method of claim 1.

* * * * *